United States Patent
Patel (10) Patent No.: US 12,158,956 B2
(45) Date of Patent: Dec. 3, 2024

(54) BOOT FIRMWARE CORRUPTION DETECTION AND MITIGATION

(71) Applicant: Advanced Micro Devices, Inc., Santa Clara, CA (US)

(72) Inventor: Nimit Madhubhai Patel, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 220 days.

(21) Appl. No.: 18/055,356

(22) Filed: Nov. 14, 2022

(65) Prior Publication Data

US 2024/0160743 A1 May 16, 2024

(51) Int. Cl.
*G06F 21/57* (2013.01)

(52) U.S. Cl.
CPC .......... *G06F 21/575* (2013.01); *G06F 21/572* (2013.01); *G06F 2221/033* (2013.01)

(58) Field of Classification Search
CPC . G06F 21/575; G06F 21/572; G06F 2221/033
See application file for complete search history.

(56) References Cited

U.S. PATENT DOCUMENTS

| 2008/0263345 A1* | 10/2008 | Booth | G06F 21/572 713/2 |
| 2023/0359466 A1* | 11/2023 | Sarkar | G06F 9/4418 |

* cited by examiner

*Primary Examiner* — Kostas J Katsikis
(74) *Attorney, Agent, or Firm* — Kowert, Hood, Munyon, Rankin & Goetzel, P.C.; Rory D. Rankin (57) ABSTRACT

An apparatus and method for providing access to reliable boot firmware. In various implementations, a computing system includes an integrated circuit with a security processor. Prior to performing any steps of a bootup operation using one of multiple copies of boot firmware, the security processor determines whether multiple signatures exist where the signatures are based on the multiple copies of boot firmware. Each of the multiple copies of boot firmware is a copy of a particular version of boot firmware. If the multiple signatures do not yet exist, then the security processor generates the signatures using the multiple copies of boot firmware. During a bootup operation, when the security processor determines that the multiple signatures already exist, the security processor uses these signatures to validate one or more of the multiple copies of boot firmware. The security processor continues with the bootup operation using the validated copy of boot firmware.

20 Claims, 5 Drawing Sheets

BOOT FIRMWARE CORRUPTION DETECTION AND MITIGATION

BACKGROUND

Description of the Relevant Art

Generally speaking, a variety of semiconductor chips include at least one processing unit coupled to a memory. The processing unit processes instructions (or commands) by fetching instructions and data, decoding instructions, executing instructions, and storing results. The processing unit sends memory access requests to the memory for fetching instructions, fetching data, and storing results of computations. Examples of the processing unit are a central processing unit (CPU), an application specific integrated circuit (ASIC), a field programmable gate array (FPGA), a multimedia engine, and a processing unit with a highly parallel microarchitecture such as a graphics processing unit (GPU) and a digital signal processor (DSP). In some designs, the processing unit and the memory are on a same die such as a system-on-a-chip (SOC), whereas, in other designs, the processing unit and the memory are on different dies within a same package such as a multi-chip-module (MCM) or in a system in a package (SiP).

A variety of computing devices use the above examples of semiconductor chips. Examples of these computing devices are a desktop computer, a laptop computer, a server computer, a tablet computer, a smartphone, a gaming device, a smartwatch, and so on. To begin operating these computing devices and executing applications, one of a cold bootup operation and a warm bootup operation is performed. A cold bootup operation occurs when the computing device has been switched off, or otherwise had its power supply removed. A warm bootup operation occurs when the computing device maintains connection to its power supply without interruption, but the user restarts the computing device through a provided command or a particular input key sequence on the keyboard.

In either case of a cold bootup operation or a warm bootup operation, prior to executing applications, several steps are performed such as verifying available hardware resources are functioning, and loading a preferred operating system. These steps follow an algorithm with instructions organized in small programs distributed across on-chip memory and within partitions of disk memory. The initial small program is boot firmware stored in the on-chip memory. In some cases, the boot firmware is a program called basic input/output system (BIOS) that follows a master boot record (MBR) standard. In other cases, the boot firmware is a program called unified extensible firmware interface (UEFI) that follows the globally unique identifiers (GUID) partition table (GPT) standard.

It is possible that the boot firmware becomes corrupted, which leads to the computing device being unable to boot and function, or the computing device provides abnormal behavior. Data corruption of the boot firmware can be caused by intended malicious attacks, unintentional electromigration effects, and radiation such as exposure to gamma rays. Avoiding the computing device from becoming inoperable is important, especially when the computing device is used for medical applications, scientific research, financial management and financial transaction, and so on.

In view of the above, methods and systems for providing access to reliable boot firmware are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods that support providing access to reliable boot firmware are contemplated. In various implementations, a computing system includes an integrated circuit with a security processor. Examples of the integrated circuit are a central processing unit (CPU), a digital signal processor (DSP), a graphics processing unit (GPU), an application specific integrated circuit (ASIC), a field programmable gate array (FPGA), a multimedia engine, and so forth. Prior to performing any steps of a bootup operation using one of multiple copies of boot firmware, the security processor determines whether multiple signatures exist where the signatures are based on the multiple copies of boot firmware. Each of the multiple copies of boot firmware is a copy of a particular version of boot firmware. Therefore, an initial version of each of the multiple copies of boot firmware is a copy of one another. Consequently, each of the multiple signatures is a copy of one another. If the multiple signatures do not yet exist, then the security processor generates the signatures using the multiple copies of boot firmware.

During a bootup operation, when the security processor determines that the multiple signatures already exist, the security processor uses these signatures to validate one or more of the multiple copies of boot firmware. The security processor updates a log file that documents the steps performed and the results of the steps until the security processor finds a validated copy of boot firmware. Afterward, the security processor continues with the bootup operation using the validated copy of boot firmware. Further details of these techniques to provide access to reliable boot firmware are provided in the following description of FIGS. 1-5.

Figure 1:
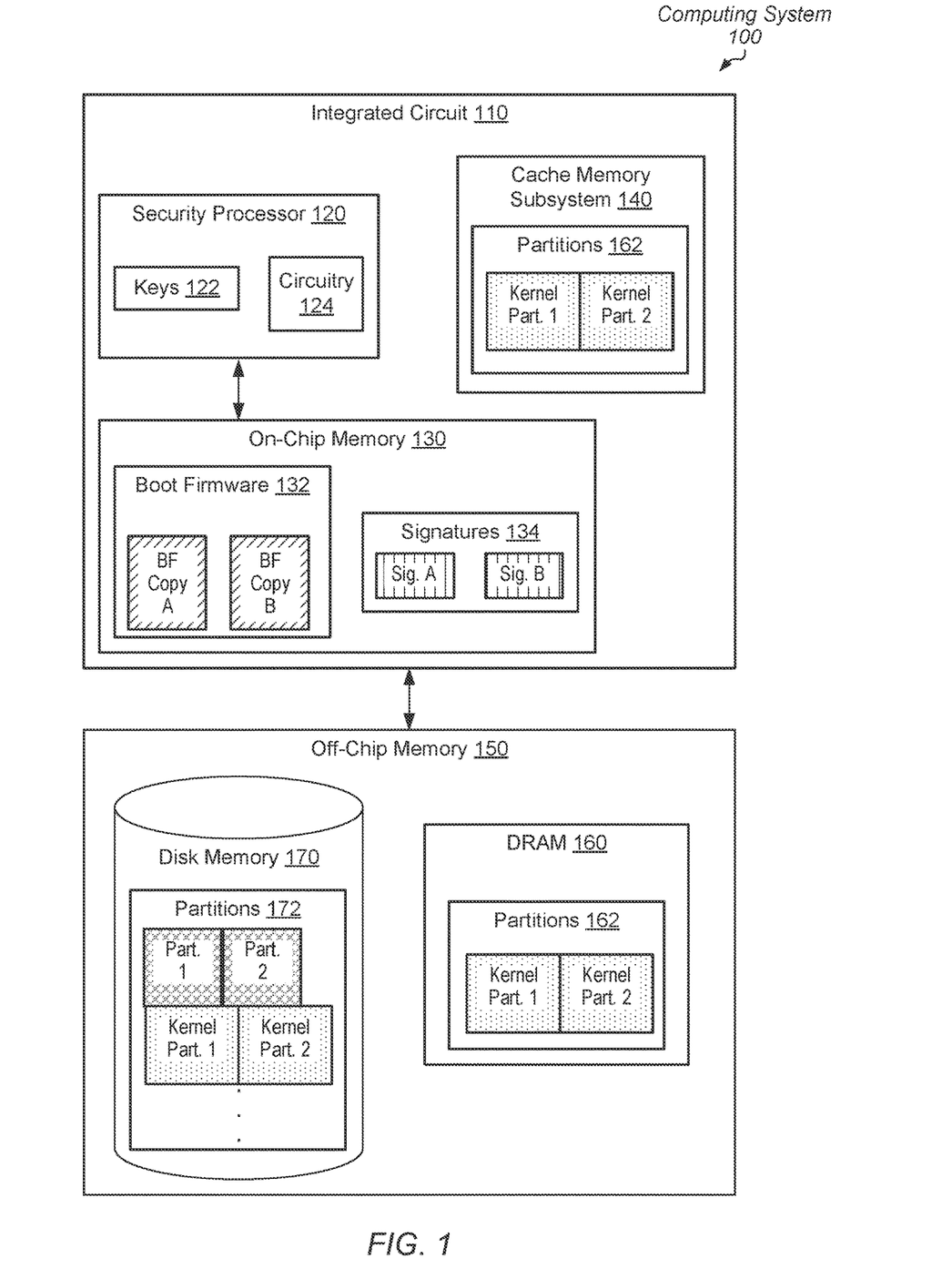
FIG. 1 is a generalized block diagram of a computing system that supports providing access to reliable boot firmware.

Referring to FIG. 1, a generalized block diagram is shown of a computing system 100 that supports providing access to reliable boot firmware. An integrated circuit 110 includes at least a security processor 120, on-chip memory 130, and a separate cache memory subsystem 140. The integrated circuit 110 is connected to off-chip memory 150. The off-chip memory 150 includes at least dynamic random-access memory (DRAM) 160 and disk memory 170. The disk memory 170 includes one or more of hard disk drives (HDDs) and solid-state disks (SSDs). Clock sources, such as phase lock loops (PLLs), an interrupt controller, a communication fabric, power controllers, memory controllers, interfaces for input/output (I/O) devices, one or more temperature sensors and current sensors, and so forth are not shown in the computing system 100 for ease of illustration. It is also noted that the number of components of the computing system 100 and the number of subcomponents for those shown in FIG. 1 can vary from implementation to implementation. There can be more or fewer of each component/subcomponent than the number shown for the computing system 100.

The integrated circuit 110 can be used within any of a variety of types of circuits such as a central processing unit (CPU), a digital signal processor (DSP), a graphics processing unit (GPU), an application specific integrated circuit (ASIC), a field programmable gate array (FPGA), a multimedia engine, and so forth. In various implementations, the components of the integrated circuit 110 are on a same die such as a system-on-a-chip (SOC). A variety of computing devices use the integrated circuit 110 such as a desktop computer, a laptop computer, a server computer, a tablet computer, a smartphone, a gaming device, a smartwatch, and so on.

In some implementations, the security processor 120 includes the circuitry of a processor core of a multi-core processor. In other implementations, the security processor 120 includes the circuitry of a stand-alone (not a core of multiple cores), dedicated unit or processor or other type of circuit. In an implementation, the on-chip memory 130 is a type of on-die flash memory. In some implementations, the on-chip memory 130 is NOR-type flash memory, whereas, in an implementation, the disk memory 170 uses NAND-type flash memory. Flash memory provides a type of non-volatile memory that performs read and write operations on data at a granularity of a byte within a page with each page having a size of 8 kilobytes to 16 kilobytes (8 KB-16 KB). The flash memory includes multiple blocks with each block including multiple pages. A block can have a range of sizes from 4 megabytes to 8 megabytes (4 MB-8 MB). The flash memory performs erase operations at the granularity of a block. Being non-volatile, the flash memory retains stored data regardless of whether the integrated circuit 110 is powered on such a being connected to a power supply voltage reference level.

As shown, the on-chip memory 130 stores boot firmware 132. As used herein, "firmware" includes instructions of an algorithm to be executed by circuitry to perform low-level tasks. An example of a low-level task is performing initial steps of a bootup operation. There are at least two standards used to define how information used during a bootup operation is stored on the computing system 100. A first standard uses a master boot record (MBR) and boot firmware referred to as basic input/output system (BIOS). A second standard uses the globally unique identifiers (GUID) partition table (GPT) and boot firmware referred to as unified extensible firmware interface (UEFI). The boot firmware 132 includes multiple copies of a particular boot firmware (BF). The multiple copies of the particular boot firmware are shown as "BF Copy A" and "BF Copy B." Although two copies are shown, another number of copies are possible and contemplated. In an implementation, the boot firmware 132 includes multiple copies of a particular version of boot firmware that belongs either to the MBR standard (such as BIOS) or the GPT standard (such as UEFI).

The cache memory subsystem 140 includes one or more levels of a hierarchical memory subsystem using a slower type of memory than registers, but a faster type of memory than the DRAM 160 and the disk memory 170 of the off-chip memory 150. In an implementation, one or more levels of the cache memory subsystem 140 utilizes one of a variety of types of on-chip synchronous RAM (SRAM). The cache memory subsystem 140 stores a copy of a subset of the data stored in the off-chip memory 150, and reduces latencies of memory requests generated by the security processor 120 and any other types of circuitry within the integrated circuit 110. Compared to memory bit cells, such as 6T bit cells, used in the on-chip SRAM, the DRAM 160 that implements the system memory of computing system 100 reaches higher densities. Unlike HDDs and flash memory, the DRAM 160 is volatile memory, rather than non-volatile memory. The DRAM 160 loses its data relatively quickly when a power supply is removed. The disk memory 170 includes one or more of hard disk drives (HDDs) and solid-state disks (SSDs).

As shown, each of the DRAM 160 and the disk memory 170 of the off-chip memory 150 stores a copy of multiple partitions. For example, the disk memory 170 stores the partitions 172, and the DRAM 160 stores the partitions 162. Each one of the partitions 172 is used as if it was a separate hard disk by the operating system and corresponding file system. Partitioning the disk memory 170 allows multiple operating systems and file systems to have information stored on the disk memory 170. Each operating system and each file system within a respective operating system uses a corresponding partition independently from other operating systems and other file systems. Without partitions, a separate disk memory can be used for each separate operating system and each separate mounted file system. The number of partitions and the content of each of the partitions in partitions 172 follows either the MBR standard (that uses BIOS as boot firmware) or the GPT standard (that uses UEFI as boot firmware).

The partitions 172 are shown to include at least "Part. 1" (Partition 1), "Part. 2" (Partition 2), "Kernel Part. 1" (Kernel Partition 1), and "Kernel Part. 2" (Kernel Partition 2). These partitions can represent a variety of primary partitions, partitions with a root directory and one or more boot loaders for loading and running components of a particular operating system, partitions that include files and small programs to setup one or more file systems and/or one or more subdirectories of a particular file system, and so forth. During a bootup operation, the security processor 120 selects one of "BF Copy A" and "BF Copy B" of boot firmware 132 and runs it. For example, the circuitry 124 of the security processor 120 executes the instructions of the algorithm defined by the selected one of "BF Copy A" and "BF Copy B" of boot firmware 132.

In various implementations, the algorithm described by the selected one of "BF Copy A" and "BF Copy B" of boot firmware 132 includes steps of one or more of a hardware discovery of computing system 100, determining which I/O devices are bootable, determining whether any hardware resources are malfunctioning by performing a power-on self-test (POST), checking for custom or updated settings, loading the interrupt handlers and device drivers, initializing power management, displaying system settings, and loading initial programs of a bootstrap sequence. The algorithm described by the selected one of "BF Copy A" and "BF Copy B" loads programs from a selected one of the partitions 172. During the bootup operation, copies of selected partitions (or subsets of the selected partitions) are loaded from disk memory 170 and stored on the DRAM 160 and the cache memory subsystem 140.

Prior to performing any steps of the bootup operation using the selected one of "BF Copy A" and "BF Copy B" of boot firmware 132, the hardware of security processor 120, such as circuitry 124, determines whether the signatures 134 exist in the on-chip memory 130. For example, during a first-ever initial bootup operation for computing system 100, the signatures 134 do not yet exist. The security processor 120 performs this determination by checking a particular flag in a control and status register (CSR) in the on-chip memory 130, or by searching for the signatures 134 and not finding them. If the signatures 134 do not yet exist, the security processor 120 generates the signatures 134 using the boot firmware 132. For example, the signature "Sig. A" of signatures 134 is based on "BF Copy A" of boot firmware 132. Similarly, the signature "Sig. B" of signatures 134 is based on "BF Copy B" of boot firmware 132.

In various implementations, each of "BF Copy A" and "BF Copy B" of boot firmware 132 is a copy of a particular version of boot firmware. Therefore, an initial version of each of "BF Copy A" and "BF Copy B" is a copy of one another. Accordingly, each of "Sig. A" and "Sig. B" of signatures 134 is a same value. In an implementation, to generate "Sig. A" of signatures 134, the security processor 120 performs one of a variety of a hash algorithms on "BF Copy A" of boot firmware 132. Examples of the hash algorithm are the MD5 algorithm, the SHA-2 algorithm, the SHA-256 algorithm, the NTLM algorithm, and so on. Afterward, the security processor 120 uses one or more keys of keys 122 with a corresponding encryption algorithm to encrypt the hash value. In an implementation, the security processor 120 executes a symmetric encryption algorithm that uses a single key of keys 122 to encrypt the hash value. In another implementation, the security processor 120 executes an asymmetric encryption algorithm that uses a pair of keys of keys 122 (private key and public key) to encrypt the hash value. The security processor 120 uses the public key to encrypt the hash value, and uses the private key to decrypt the hash value. Whether symmetric encryption or asymmetric encryption is used, the encrypted hash value is "Sig. A" of signatures 134, which is based on "BF Copy A" of boot firmware 132. In a similar manner, the security processor 120 generates is "Sig. B" of signatures 134, which is based on "BF Copy B" of boot firmware 132. Since an initial version of each of "BF Copy A" and "BF Copy B" is a copy of one another, each of "Sig. A" and "Sig. B" of signatures 134 is also a copy of one another.

During a bootup operation, when the security processor determines that "Sig. A" and "Sig. B" of signatures 134 already exist, the security processor uses these signatures to validate one or more of "BF Copy A" and "BF Copy B" of boot firmware 132. If the security processor 120 selects "BF Copy A" during the bootup operation, then the security processor 120 performs the same steps on "BF Copy A" to generate "Sig. A." Following, the security processor compares the recently generated version of "Sig. A" and the previously stored version of "Sig. A." If the two versions match, then the security processor 120 continues with the bootup operation using the selected "BF Copy A."

If the two versions do not match, then the security processor 120 performs the same steps as described earlier on "BF Copy B" to generate "Sig. B." Following, the security processor compares the recently generated version of "Sig. B" and the previously stored version of "Sig. B." If the two versions match, then in an implementation, the security processor 120 continues with the bootup operation using the selected "BF Copy B." The security processor 120 can also update a log file with details of the mismatch and using another copy of the boot firmware, rather than the initially selected copy of the boot firmware. The details can include identification of which portion of "BF Copy A" did not match, a timestamp of detecting the mismatch, which copy of the boot firmware was actually used to perform the bootup operation, and so on. In another implementation, the security processor 120 repairs "BF Copy A" using "BF Copy B." For example, the security processor 120 overwrites "BF Copy A" using "BF Copy B." Afterward, the security processor 120 can use either of "BF Copy A" and "BF Copy B" to continue the bootup operation.

Figure 2:
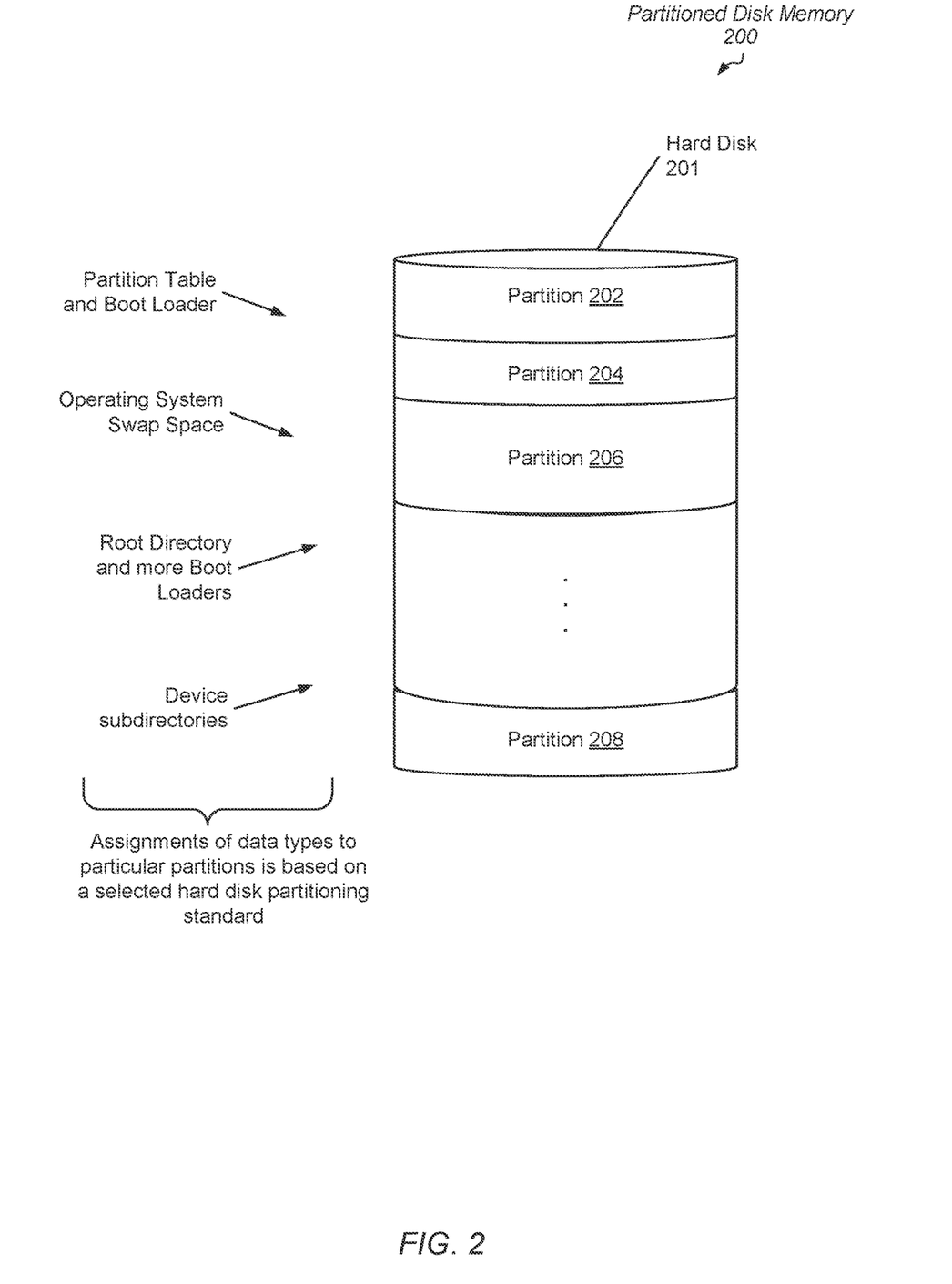
FIG. 2 is a generalized block diagram of a partitioned disk memory that supports providing access to reliable boot firmware.

Referring now to FIG. 2, a generalized block diagram is shown of a partitioned disk memory 200. As shown, the hard disk 201 includes at least partitions 202-208. The hard disk 201 includes a hard disk drive (HDD) or a solid-state disk (SSD). In the shown example, the hard disk 200 is divided into at least partitions 202-208, although a different number of partitions can be used. Each one of the partitions 202-208 is used as if it was a separate hard disk by the operating system and corresponding file system. Partitioning the hard disk 200 allows multiple operating systems and file systems to have information stored on the hard disk 200. Each operating system and each file system within a respective operating system uses a corresponding partition independently from other operating systems and other file systems. Without partitions a separate hard disk can be used for each separate operating system and each separate mounted file system.

In one implementation, the hard disk 201 is partitioned in a manner that supports a master boot record (MBR) and BIOS. In another implementation, the hard disk 201 is partitioned in a manner that supports the globally unique identifiers (GUID) partition table (GPT) standard. The GPT standard can be used for computing devices that use BIOS and for computing devices that use the Unified Extensible Firmware Interface (UEFI) standard. One of the partitions 202-208 stores a partition table that describes how the hard disk 201 is partitioned. Typically, the partition at the head of the hard disk 201, such as partition 202, stores this information. The partition 202 can also store a startup program, which is referred to as a boot loader. The boot loader is read and then has execution initiated by local boot firmware (e.g., BIOS or UEFI) during a bootup operation of the computing device. The bootloader reads the partition table, checks which partition is active, or considered bootable, and the boot loader reads the first sector of that partition. The partition's boot sector contains a small program that reads the first part of the operating system stored on that partition and begins loading and running it. In some implementations, the partition 202 uses a format that corresponds with a master boot record (MBR) and BIOS. In other implementations, the system does not use the MBR, but rather the Unified Extensible Firmware Interface (UEFI) standard.

One of the partitions 202-208 stores a root directory and one or more boot loaders for loading and running components of a particular operating system. One or more of the partitions 202-208 store information, such as device drivers in subdirectories, of a particular input/output (I/O) device. One or more of the partitions 202-208 support swap space that allows the operating system to swap out less used pages and gives memory to the current application (process) that currently consumes the memory. It is possible and contemplated that numerous other examples of information and storage organization are used for the partitions 202-208, and these examples are selected based on design requirements. These partitions 202-208 are used to perform the bootup operation of a computing device, and this bootup operation is begun with a local boot firmware stored in on-chip memory. The security processor or another integrated circuit performs steps to ensure that at least one copy of the local boot firmware is available to successfully complete the bootup operation despite sources of data corruption being present.

Figure 3:
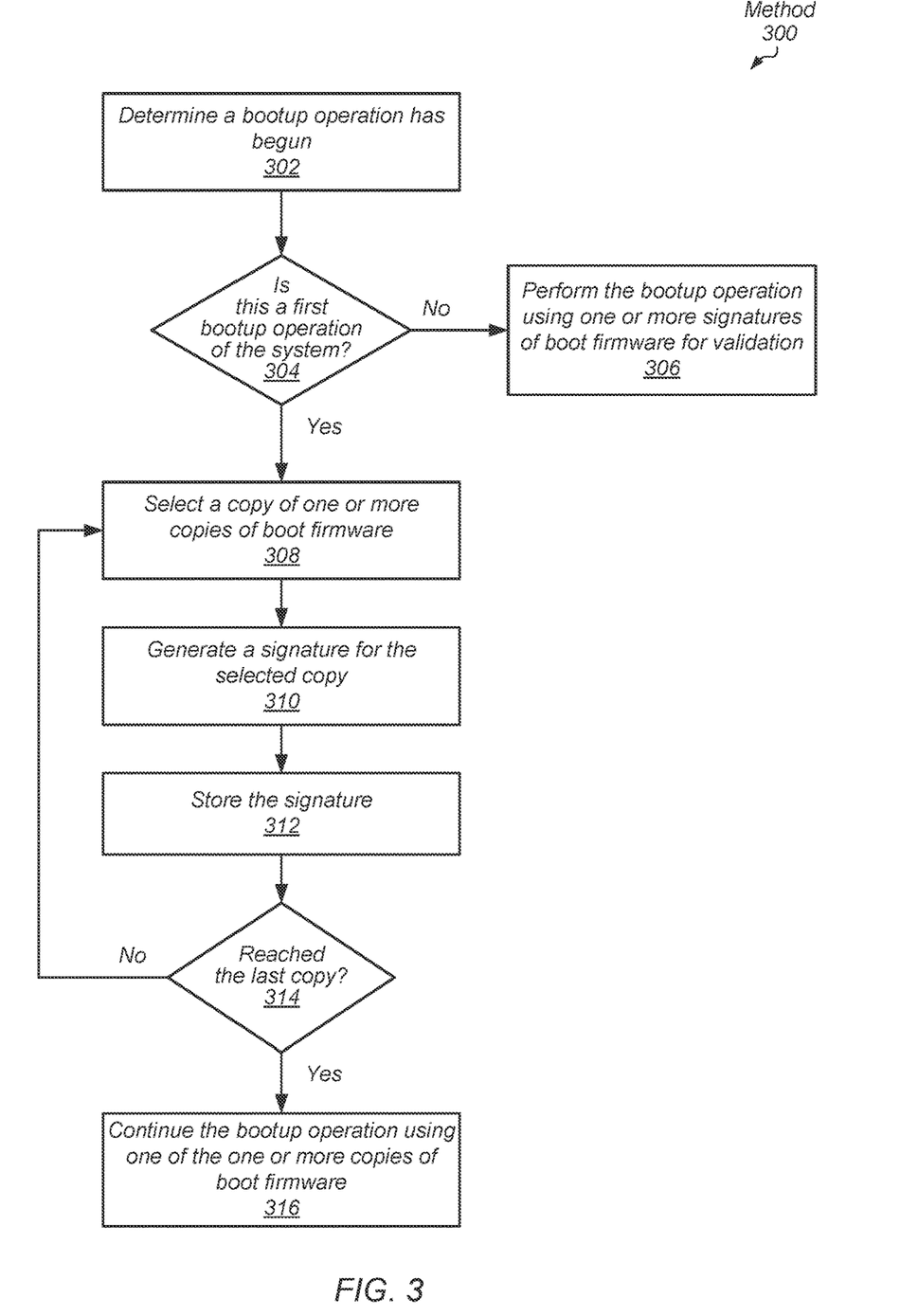
FIG. 3 is a generalized block diagram of a method for providing access to reliable boot firmware.

Referring now to FIG. 3, a generalized block diagram is shown of a method 300 for providing access to reliable boot firmware. For purposes of discussion, the steps in this implementation (as well as in FIG. 4) are shown in sequential order. However, in other implementations some steps occur in a different order than shown, some steps are performed concurrently, some steps are combined with other steps, and some steps are absent.

A security processor of an integrated circuit determines a bootup operation has begun (block 302). The bootup operation is either a cold bootup operation or a warm bootup operation. A cold bootup operation occurs when the computing device has been switched off, or otherwise had its power supply removed. A warm bootup operation occurs when the computing device maintains connection to its power supply without interruption, but the user restarts the computing device through a provided command or a particular input key sequence on the keyboard. If the security processor determines that this is not a first bootup operation of the system such as a first-ever bootup operation of the computing system ("no" branch of the conditional block 304), then the security processor performs the bootup operation using one or more signatures of boot firmware for validation (block 306). Further details of these steps are provided in the upcoming description of method 400 (of FIG. 4). The security processor can also determine that this is not a first bootup operation of the system by searching for and finding signatures corresponding to copies of boot firmware.

If the security processor determines that this is a first bootup operation of the system such as a first-ever bootup operation of the computing system ("yes" branch of the conditional block 304), then the security processor selects a copy of one or more copies of boot firmware (block 308). The security processor generates a signature for the selected copy (block 310). The security processor stores the signature (block 312). In some implementations, the security processor stores the signature in on-chip memory, such as flash memory, that also stores copies of bootup firmware.

If the security processor has not yet reached the last copy of boot firmware ("no" branch of the conditional block 314), then control flow of method 300 returns to block 308 where the security processor selects a copy of one or more copies of boot firmware. Otherwise, if the security processor has reached the last copy of boot firmware ("yes" branch of the conditional block 314), then security processor continues the bootup operation using one of the one or more copies of boot firmware (block 316).

Figure 4:
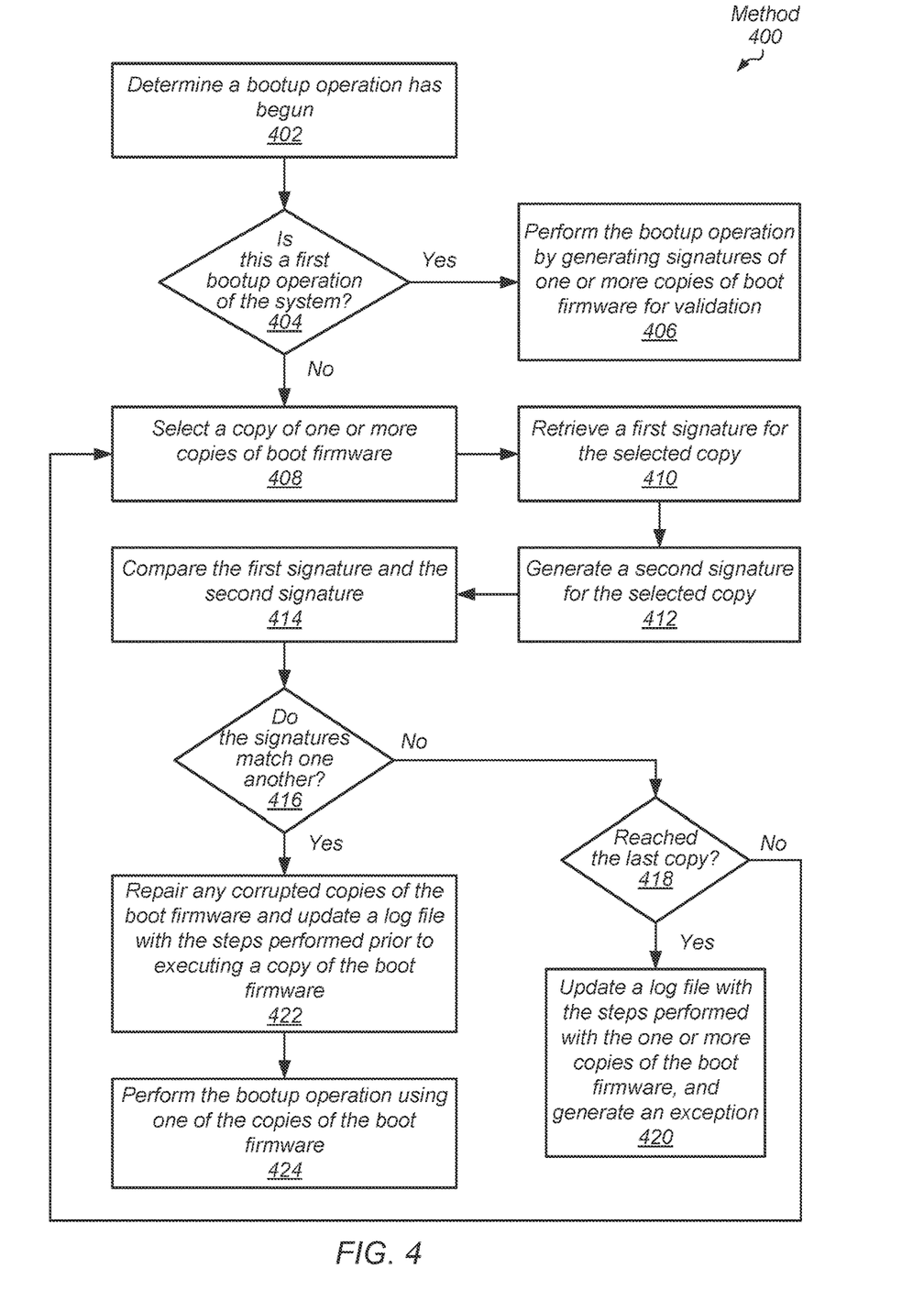
FIG. 4 is a generalized block diagram of a method for providing access to reliable boot firmware.

Turning to FIG. 4, a generalized block diagram is shown of a method 400 for providing access to reliable boot firmware. A security processor of an integrated circuit determines a bootup operation has begun (block 402). If the security processor determines that this is a first bootup operation of the system such as a first-ever bootup operation of the computing system ("yes" branch of the conditional block 404), then the security processor performs the bootup operation by generating one or more signatures of boot firmware for validation (block 406). Further details of these steps are provided in the previous description of method 300 (of FIG. 3).

If the security processor determines that this is not a first bootup operation of the system such as a first-ever bootup operation of the computing system ("no" branch of the conditional block 404), then the security processor selects a copy of one or more copies of boot firmware (block 408). The security processor retrieves a first signature for the selected copy (block 410). The security processor generates a second signature for the selected copy (block 412). The security processor compares the first signature and the second signature (block 414). If the security processor determines that the signatures do not match one another ("no" branch of the conditional block 416), and the security processor has not yet reached the last copy of boot firmware ("no" branch of the conditional block 418), then control flow of method 400 returns to block 408 where the security processor selects a copy of one or more copies of boot firmware.

It is possible that the boot firmware becomes corrupted, which leads to the computing device being unable to boot and function, or the computing device provides abnormal behavior. Data corruption of the boot firmware can be caused by intended malicious attacks, unintentional electromigration effects, and radiation such as exposure to gamma rays. In some implementations, the security processor also updates a log file with details of the mismatch. The details can include identification of which portion of the selected copy of the boot firmware that did not match, a value of the mismatching portion of the selected copy of the boot firmware, a timestamp of detecting the mismatch, and so on.

If the security processor determines that the signatures do not match one another ("no" branch of the conditional block 416), and the security processor has reached the last copy of boot firmware ("yes" branch of the conditional block 418), then the security processor updates a log file with the steps performed with the one or more copies of the boot firmware, and generates an exception (block 420). As described earlier, the details stored in the log file can include identification of the initially selected copy of the boot firmware, identification of which portion of the initially selected boot firmware that did not match, a value of the mismatching portion of the initially selected copy of the boot firmware, a timestamp of detecting the mismatch, identification of which portions of other selected copies of boot firmware that did not match and their respective mismatching values, and so on.

If the security processor determines that the signatures match one another ("yes" branch of the conditional block 416), then the security processor repairs any corrupted copies of the boot firmware, and updates a log file with the steps performed prior to executing a copy of the boot firmware (block 422). Afterward, the security processor performs the bootup operation using one of the copies of the boot firmware (block 424).

Figure 5:
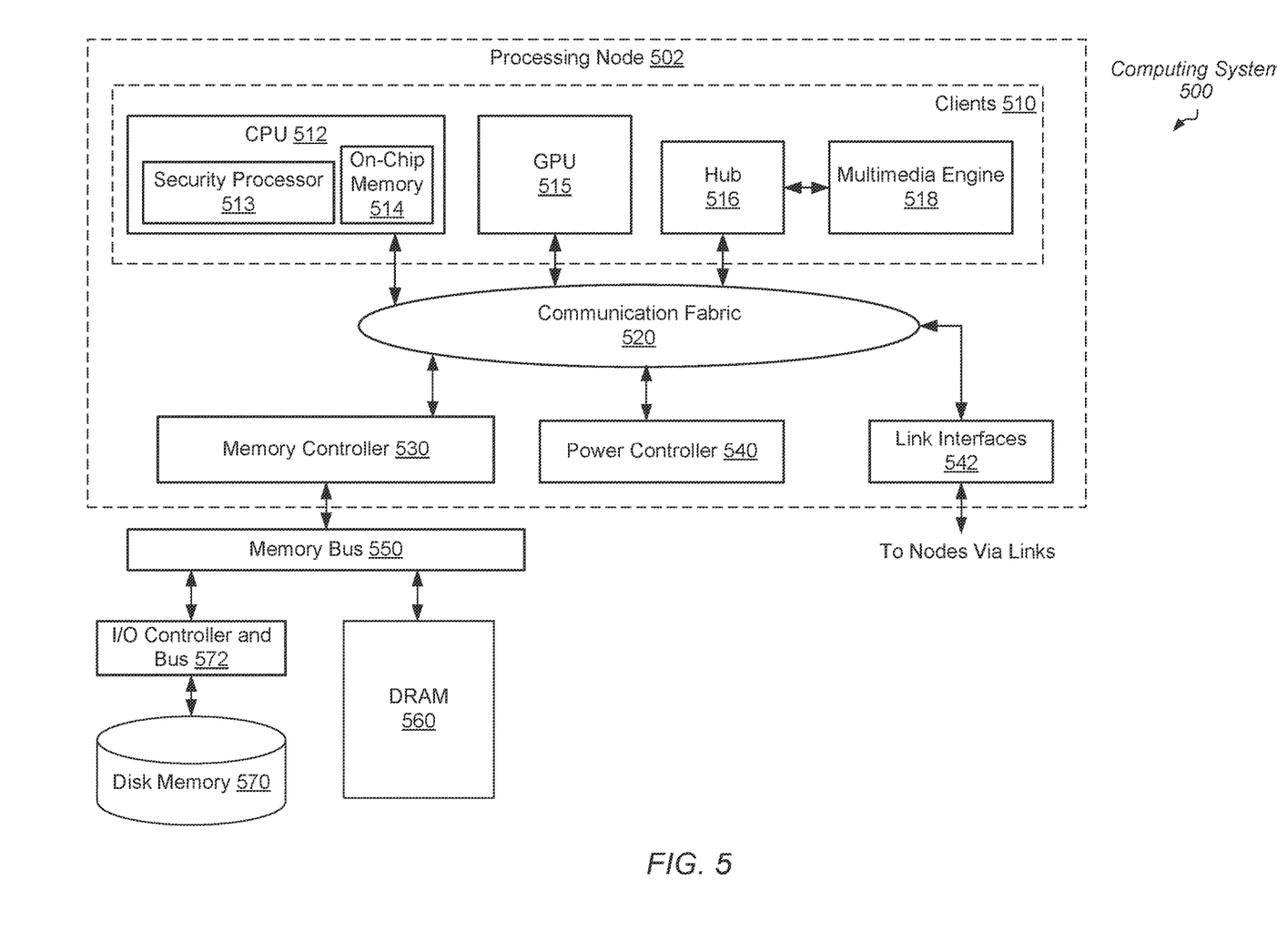
FIG. 5 is a generalized block diagram of a computing system that supports providing access to reliable boot firmware.

Referring to FIG. 5, a generalized block diagram is shown of a computing system 500 that supports providing access to reliable boot firmware. As shown, the computing system 500 includes the processing node 502. Although a single processing node is shown, it is possible and contemplated that the computing system 500 includes another number of processing nodes based on design requirements. The processing node 502 includes communication fabric 520 between each of clients 510, memory controller 530, power controller 540 and link interfaces 542. In some implementations, the components of processing node 500 are individual dies on an integrated circuit (IC), such as a system-on-a-chip (SOC). In other implementations, the components are individual dies in a system-in-package (SiP) or a multi-chip module (MCM).

In the illustrated implementation, clients 510 include central processing unit (CPU) 512, graphics processing unit (GPU) 515 and Hub 516. Hub 516 is used for communicating with Multimedia Engine 518. The CPU 512, GPU 515 and Multimedia Engine 518 are examples of computing resources capable of processing applications. Although not shown, in other implementations, other types of computing resources are included in clients 510. Each of the one or more processor cores in CPU 512 includes circuitry for executing instructions according to a given selected instruction set architecture (ISA). In various implementations, each of the processor cores in CPU 512 includes a superscalar, multi-threaded microarchitecture used for processing instructions of the given ISA. In an implementation, GPU 515 includes a high parallel data microarchitecture with a significant number of parallel execution lanes. In one implementation, the microarchitecture uses single-instruction-multiple-data (SIMD) pipeline for the parallel execution lanes. Multimedia Engine 518 includes processors for processing audio data and visual data for multimedia applications.

In an implementation, the CPU 512 includes a security processor 513 that accesses copies of boot firmware stored in the on-chip memory 514. In various implementations, the security processor 513 performs the functionality of the security processor 120 (of FIG. 1), and the on-chip memory 514 performs data storage and is used in techniques in a same manner as the on-chip memory 130 (of FIG. 1). Therefore, the computing system 500 supports providing access to reliable boot firmware. Although the security processor 513 and on-chip memory 514 are shown to be included in the CPU 512, in other implementations, they are included in another one of the clients 510.

In some implementations, the communication fabric 520 transfers traffic back and forth between computing resources 510 and memory controller 530 and includes interfaces for supporting respective communication protocols. The communication fabric 520 includes at least queues for storing requests and responses, selection circuitry for arbitrating between received requests before sending requests across an internal network, packing circuitry for building and decoding packets, and control circuitry for selecting routes for the packets.

Although a single memory controller 530 is shown, in other implementations, another number of memory controllers are used in the processing node 502. The memory controller 530 receives memory requests from clients 510 via the communication fabric 520, schedules the memory requests, and sends the scheduled memory requests to one or more of system memory and main memory. Memory controller 530 also receives responses from system memory (implemented by DRAM 560) and main memory (implemented by disk memory 570) and sends the responses to a corresponding source of the request in clients 510. The memory controller 530 also supports one or more memory interface protocols. A protocol determines values used for information transfer, such as a number of data transfers per clock cycle, signal voltage levels, signal timings, signal and clock phases and clock frequencies. In various implementations, system memory, such as DRAM 560, is filled with data from main memory through the I/O controller and bus 572 and the memory bus 550. A corresponding cache fill line with the requested block is conveyed from main memory, such as disk memory 570, to a corresponding one of the cache memory subsystems in clients 510 in order to complete the original memory request. The cache fill line is placed in one or more levels of caches.

The address space of processing node 502 is divided among at least CPU 512, GPU 515 and Hub 516 and one or more other components such as input/output (I/O) peripheral devices (not shown) and other types of computing resources. Memory maps are maintained for determining which addresses are mapped to which component, and hence to which one of CPU 512, GPU 515 and Hub 516 a memory request for a particular address should be routed. In some implementations, main memory, such as disk memory 570, is one of a variety of types of non-volatile, random access secondary storage of data. Examples of main memory are hard disk drives (HDDs) and solid-state disks (SSDs).

Link interfaces 542 support communication between processing node 502 and other processing nodes by transferring messages on links. In various implementations, the messages sent across the links between nodes include an indication of an operating state for one or more nodes, a power down request, responses to requests, interrupts, and other information. In various implementations, each link is a point-to-point communication channel between two nodes. At the physical level, a link includes one or more lanes. In some implementations, link interfaces 542, the corresponding links, and other nodes include communication protocol connections such as PCIe (Peripheral Component Interconnect Express), InfiniBand, RapidIO, HyperTransport, and so forth. In some implementations, link interfaces 542 include control circuitry and buffers or queues used to communicate with other nodes via the interconnect links.

In one implementation, power controller 540 collects data from clients 510. In some implementations, power controller 540 also collects data from memory controller 530. In some implementations, the collected data includes predetermined sampled signals. The switching of the sampled signals indicates an amount of switched capacitance. Examples of the selected signals to sample include clock gater enable signals, bus driver enable signals, mismatches in content-addressable memories (CAM), CAM word-line (WL) drivers, and so forth. In an implementation, power controller 540 collects data to characterize power consumption in node 500 during given sample intervals. On-die current sensors and temperature sensors in node 500 also send information to power controller 540. Power controller 540 uses one or more of the sensor information, a count of issued instructions or issued threads, and a summation of weighted sampled signals to estimate power consumption for node 500. Power controller 540 decreases (or increases) power consumption if node 500 is operating above (below) a threshold limit. In some implementations, power controller 540 selects a respective power-performance state (P-state) for each of the computing resources in clients 510. The P-state includes at least an operating voltage and an operating clock frequency.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high-level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware-based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. A security processor comprising:
   circuitry;
   wherein responsive to a first bootup operation and an existence of a plurality of signatures corresponding to a plurality of copies of boot firmware, the circuitry is configured to:
      retrieve a first signature, of the plurality of signatures, corresponding to a first copy of boot firmware of the plurality of copies of boot firmware;
      generate a second signature based on the first copy of boot firmware; and
      execute the first bootup operation using the first copy of boot firmware, responsive to a match between the first signature and the second signature.

2. The security processor as recited in claim 1, wherein an initial version of each of the plurality of copies of boot firmware is a same copy of a given boot firmware that performs initial steps of a bootup operation.

3. The security processor as recited in claim 2, wherein each of the plurality of signatures is equal to a given signature generated by any one of the plurality of copies of boot firmware.

4. The security processor as recited in claim 1, wherein in response to a second bootup operation, and a determination that the plurality of signatures corresponding to the plurality of copies of boot firmware do not exist, the circuitry is configured to generate a corresponding hash value for each of the plurality of copies of boot firmware.

5. The security processor as recited in claim 4, wherein the circuitry is further configured to:
   generate a corresponding signature for each hash value and store the corresponding signature in on-chip memory; and
   execute the second bootup operation using one of the plurality of copies of boot firmware.

6. The security processor as recited in claim 2, wherein in response to a second bootup operation, and an existence of the plurality of signatures corresponding to the plurality of copies of boot firmware, the circuitry is further configured to:
   retrieve a third signature of the plurality of signatures corresponding to a second copy of boot firmware of the plurality of copies of boot firmware;
   generate a fourth signature based on the second copy of boot firmware; and
   continue generating and comparing signatures corresponding to the plurality of copies of boot firmware until a match is found for the third signature, in response to a mismatch between the third signature and the fourth signature.

7. The security processor as recited in claim 6, wherein the circuitry is further configured to:
   repair one or more of the plurality of copies of boot firmware using a third copy of boot firmware of the plurality of copies of boot firmware that provides a generated signature that matches the third signature; and
   execute the second bootup operation using the third copy of boot firmware.

8. A method, comprising:
   storing data by on-chip memory;
   responsive to a first bootup operation and an existence of a plurality of signatures corresponding to a plurality of copies of boot firmware:
      retrieving, by circuitry of a security processor, a first signature of the plurality of signatures corresponding to a first copy of boot firmware of the plurality of copies of boot firmware;
      generating, by the security processor, a second signature based on the first copy of boot firmware; and
      executing, by the security processor, the first bootup operation using the first copy of boot firmware, responsive to a match between the first signature and the second signature.

9. The method as recited in claim 8, wherein an initial version of each of the plurality of copies of boot firmware is a same copy of a given boot firmware that performs initial steps of a bootup operation.

10. The method as recited in claim 9, wherein each of the plurality of signatures is equal to a given signature generated by any one of the plurality of copies of boot firmware.

11. The method as recited in claim 8, wherein in response to a second bootup operation, and a determination that the plurality of signatures corresponding to the plurality of copies of boot firmware do not exist, the circuitry is configured to generate a corresponding hash value for each of the plurality of copies of boot firmware.

12. The method as recited in claim 11, further comprising:
generating, by the security processor, a corresponding signature for each hash value and store the corresponding signature in on-chip memory; and
executing the second bootup operation using one of the plurality of copies of boot firmware.

13. The method as recited in claim 9, wherein in response to a second bootup operation, and an existence of the plurality of signatures corresponding to the plurality of copies of boot firmware, the method further comprises:
retrieving, by the security processor, a third signature of the plurality of signatures corresponding to a second copy of boot firmware of the plurality of copies of boot firmware;
generating, by the security processor, a fourth signature based on the second copy of boot firmware; and
continuing generating and comparing signatures corresponding to the plurality of copies of boot firmware until a match is found for the third signature, in response to a mismatch between the third signature and the fourth signature.

14. The method as recited in claim 13, further comprising:
repairing, by the security processor, one or more of the plurality of copies of boot firmware using a third copy of boot firmware of the plurality of copies of boot firmware that provides a generated signature that matches the third signature; and
executing the second bootup operation using the third copy of boot firmware.

15. A computing system comprising:
on-chip memory configured to store data; and
a security processor comprising:
circuitry;
wherein responsive to a first bootup operation and an existence of a plurality of signatures corresponding to a plurality of copies of boot firmware, the circuitry is configured to:
retrieve a first signature of the plurality of signatures corresponding to a first copy of boot firmware of the plurality of copies of boot firmware;
generate a second signature based on the first copy of boot firmware; and
execute the first bootup operation using the first copy of boot firmware, responsive to a match between the first signature and the second signature.

16. The computing system as recited in claim 15, wherein an initial version of each of the plurality of copies of boot firmware is a same copy of a given boot firmware that performs initial steps of a bootup operation.

17. The computing system as recited in claim 16, wherein each of the plurality of signatures is equal to a given signature generated by any one of the plurality of copies of boot firmware.

18. The computing system as recited in claim 15, wherein in response to a second bootup operation, and a determination that the plurality of signatures corresponding to the plurality of copies of boot firmware do not exist, the circuitry is configured to generate a corresponding hash value for each of the plurality of copies of boot firmware.

19. The computing system as recited in claim 18, wherein the circuitry is further configured to:
generate a corresponding signature for each hash value and store the corresponding signature in on-chip memory; and
execute the second bootup operation using one of the plurality of copies of boot firmware.

20. The computing system as recited in claim 16, wherein in response to a second bootup operation, and an existence of the plurality of signatures corresponding to the plurality of copies of boot firmware, the circuitry is further configured to:
retrieve a third signature of the plurality of signatures corresponding to a second copy of boot firmware of the plurality of copies of boot firmware;
generate a fourth signature based on the second copy of boot firmware; and
continue generating and comparing signatures corresponding to the plurality of copies of boot firmware until a match is found for the third signature, in response to a mismatch between the third signature and the fourth signature.

\* \* \* \* \*